US010960538B2

(12) United States Patent
Xiong et al.

(10) Patent No.: US 10,960,538 B2
(45) Date of Patent: Mar. 30, 2021

(54) SERVO AND ROBOT HAVING THE SAME

(71) Applicant: UBTECH Robotics Corp, Shenzhen (CN)

(72) Inventors: Youjun Xiong, Shenzhen (CN); Hongyu Ding, Shenzhen (CN); Hongbo Zhu, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 234 days.

(21) Appl. No.: 16/059,057

(22) Filed: Aug. 9, 2018

(65) Prior Publication Data

US 2019/0152053 A1 May 23, 2019

(30) Foreign Application Priority Data

Nov. 23, 2017 (CN) .......................... 201711182333.0

(51) Int. Cl.
*B25J 9/12* (2006.01)
*F16H 55/17* (2006.01)
*B25J 9/10* (2006.01)
*F16H 35/10* (2006.01)
*F16H 57/00* (2012.01)
(Continued)

(52) U.S. Cl.
CPC .............. *B25J 9/126* (2013.01); *B25J 9/102* (2013.01); *F16D 7/021* (2013.01); *F16H 35/10* (2013.01); *F16H 55/17* (2013.01); *F16H 57/0018* (2013.01); *F16D 1/0835* (2013.01); *F16H 2048/385* (2013.01)

(58) Field of Classification Search
CPC ....... B25J 9/12; B25J 9/10; B25J 9/102; B25J 9/126; F16H 55/17; F16H 35/10; F16H 57/0018; F16H 2048/385; F16D 7/021; F16D 1/0835
See application file for complete search history.

(56) References Cited

U.S. PATENT DOCUMENTS 6,333,839 B1* 12/2001 Misso ..................... F16C 27/04
360/265.7
2002/0112555 A1* 8/2002 Chikaraishi ............... F16H 1/16
74/388 PS
(Continued)

FOREIGN PATENT DOCUMENTS

JP 1997221052 8/1997
JP 2002002509 A 1/2002
(Continued)

*Primary Examiner* — Naishadh N Desai

(57) ABSTRACT

A servo includes a motor, an output shaft used to drive an external component and having an external lateral surface, a gear set arranged between the motor and the output shaft and used to transmit power from the motor to the output shaft. The gear set includes an output gear arranged around the output shaft. The output gear defines a through hole that allows the output shaft to pass therethrough. The through hole has an internal lateral surface facing the external lateral surface. The servo further includes a connection ring arranged around the output shaft between the external lateral surface and the internal lateral surface. The connection ring is used to connect the output gear to the output shaft when a load placed on the output shaft is less than a preset value, and disconnect the output gear from the output shaft when the load exceeds the preset value.

17 Claims, 9 Drawing Sheets

(51) Int. Cl.
*F16D 7/02* (2006.01)
*F16H 48/38* (2012.01)
*F16D 1/08* (2006.01)

(56) References Cited

U.S. PATENT DOCUMENTS

| | | | | |
|---|---|---|---|---|
| 2003/0084736 A1* | 5/2003 | Darby | ................. | F16H 25/2021 74/89.23 |
| 2006/0046858 A1* | 3/2006 | Brissette | ............... | F16D 1/0835 464/51 |
| 2006/0228174 A1* | 10/2006 | Woodhead | ............ | F16C 35/073 403/371 |
| 2009/0285627 A1* | 11/2009 | Slayne | .................... | B23P 11/00 403/368 |
| 2014/0125207 A1* | 5/2014 | Kim | ....................... | H02K 29/08 310/68 B |

FOREIGN PATENT DOCUMENTS

| | | |
|---|---|---|
| JP | 2006095120 A | 4/2006 |
| JP | 2016504543 A | 2/2016 |
| WO | WO2004016961 A1 | 2/2004 |

\* cited by examiner

SERVO AND ROBOT HAVING THE SAME

CROSS REFERENCE TO RELATED APPLICATIONS

This application claims priority to Chinese Patent Application No. 201711182333.0, filed Nov. 23, 2017, which is hereby incorporated by reference herein as if set forth in its entirety.

BACKGROUND

1. Technical Field

The present disclosure generally relates to servos, and particularly to a servo with overload protection function and a robot having the servo.

2. Description of Related Art

Servos are widely used in many humanoid robots (e.g., service robots) for driving joints thereof. A servo generally includes a motor for providing power, an output shaft connected with an external mechanism, and a gear set for transmitting the power of the motor to the output shaft. The gear set includes an output gear fixedly connected to the output shaft. During the operation of the robots, there may be some occasions when the robots bump into a fixed object (e.g., a wall) or even fall to the ground. In these situations, the output shafts of some servos will withstand a large instantaneous torque. Since the output gear in the servo is fixed to the output shaft, the instantaneous torque is transmitted to the output gear, which may damage the output gear due to excessive load.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
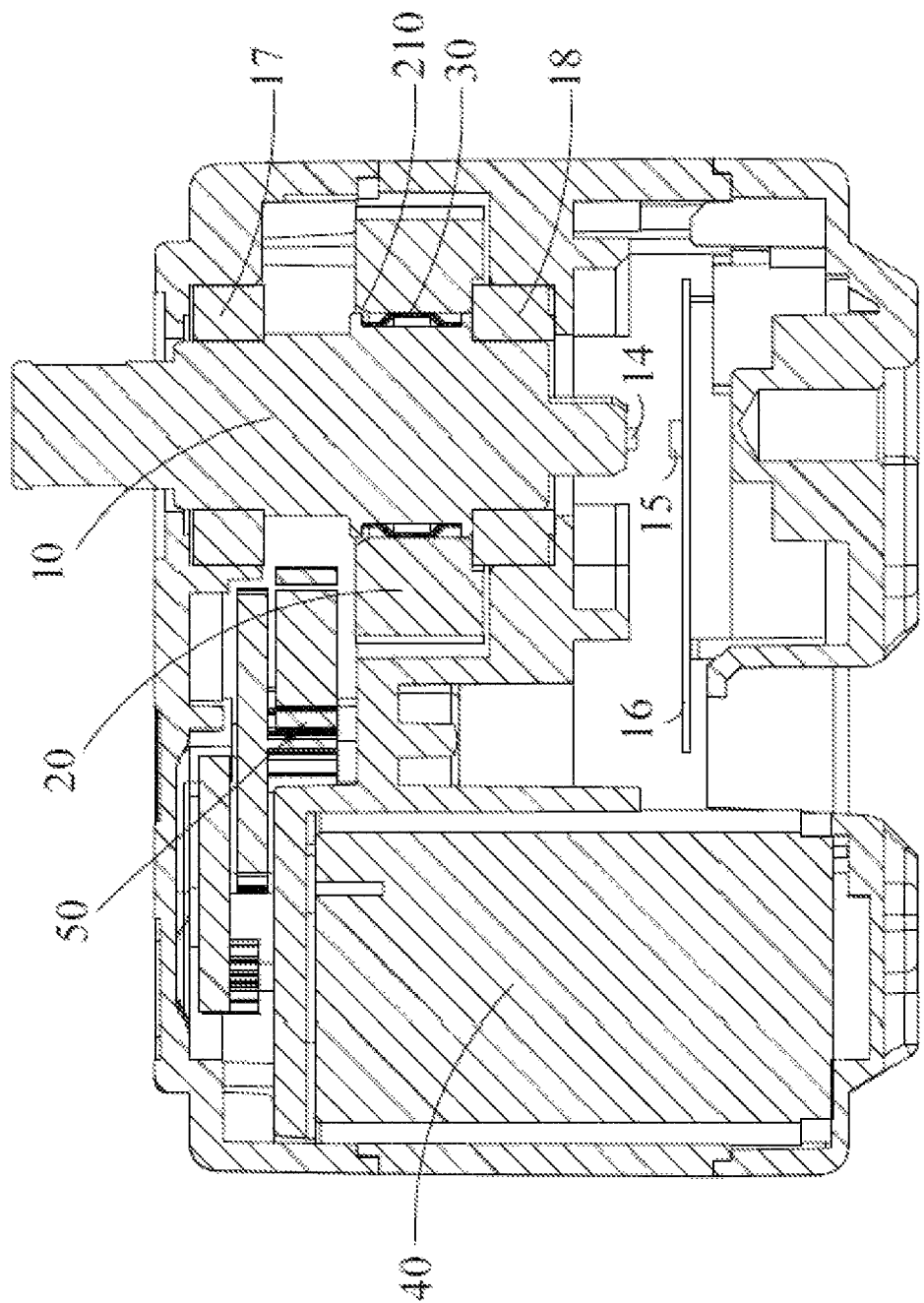
FIG. 1 is a planar sectional view of a servo according to an embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 2:
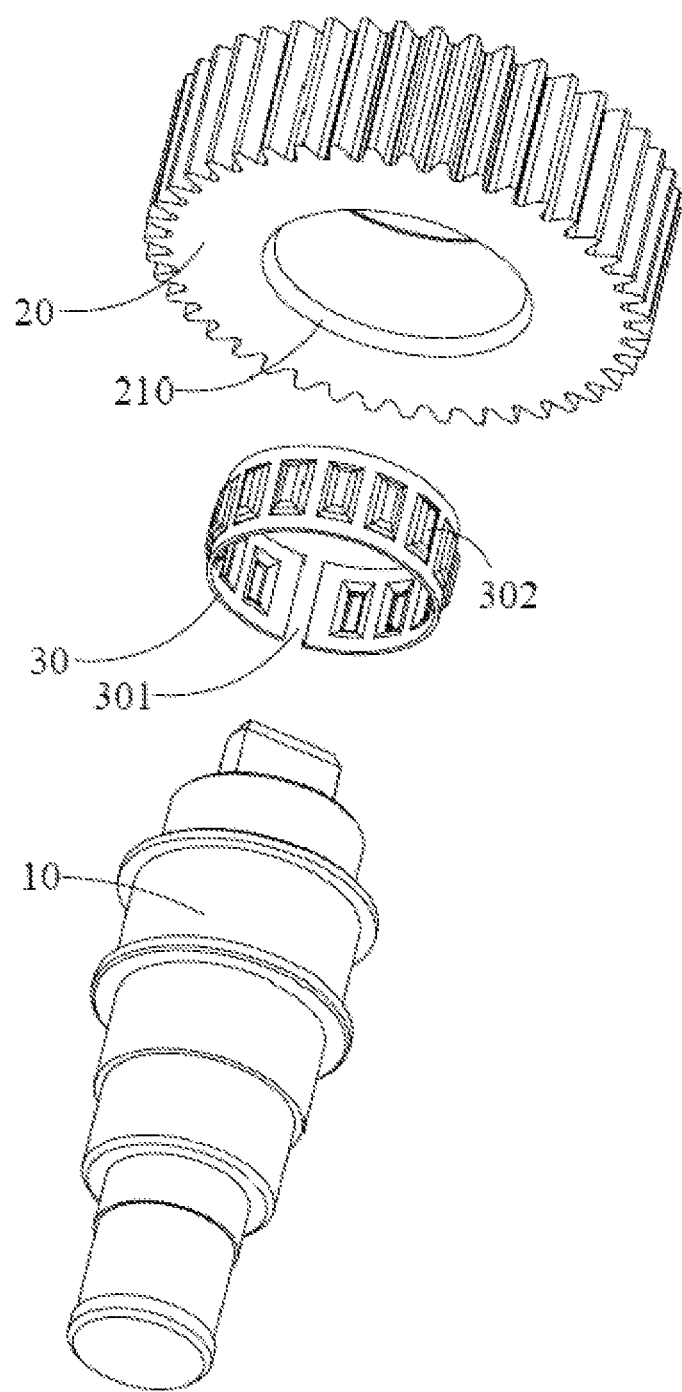
FIG. 2 is an exploded view showing an output shaft, a connection ring and an output gear of the servo of FIG. 1.
Figure 3:
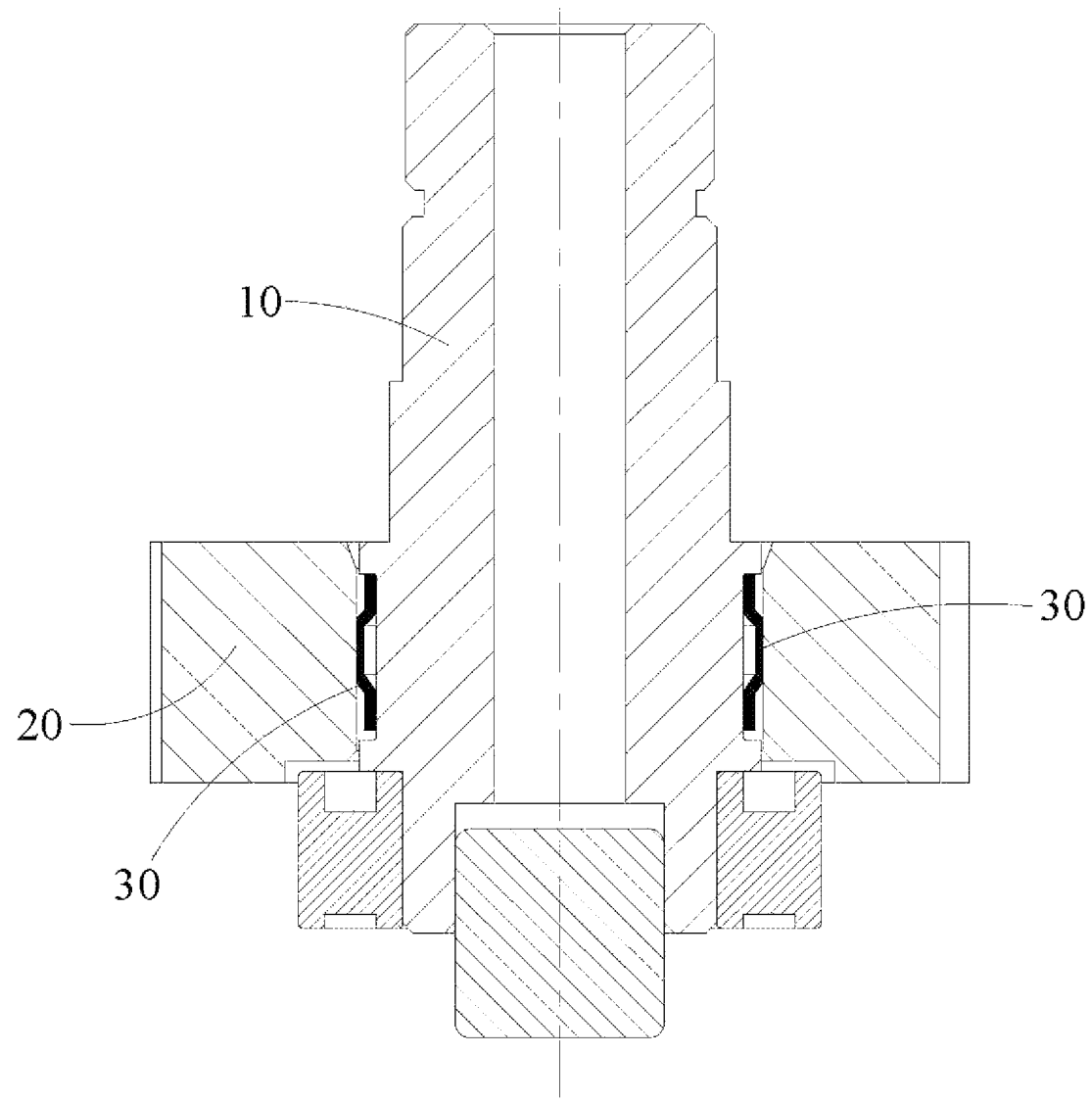
FIG. 3 is a planar sectional view of the output shaft and the output gear of FIG. 1.

Referring to FIGS. 1 to 3, in one embodiment, a servo includes a motor 40, an output shaft 10 used to drive an external component, and a gear set 50 connected to the motor 40 and the output shaft 10 and used to transmit power from the motor 40 to the output shaft 10. The output shaft 10 is rotatably supported by two bearings 17 and 18 which also prevents the axial movement of the output shaft 10. The gear set 50 includes an output gear 20 arranged around the output shaft 10. The output gear 20 defines a through hole 21 that allows the output shaft 10 to pass therethrough. The through hole 21 has an internal lateral surface 22 facing the output shaft 10. The output shaft 10 includes an external lateral surface 11 facing the internal lateral surface 22. The servo further includes a connection ring 30 arranged around the output shaft 10 between the external lateral surface 11 and the internal lateral surface 22. The connection ring 30 has an internal side surface and an external side surface that respectively abut against the external lateral surface 11 and the internal lateral surface 22. The connection ring 30 is in tight fit with the output shall 10 and the through hole 21. In the embodiment, for ease of insertion of the connecting ring 30 into the through hole 21, the through hole 21 can be provided with a fillet or chamfer 210, at one end or both opposite ends thereof. In the case of a fillet 210, the distance between the tangent of an imaginary circle, a part of which the fillet 210 is, parallel to the axis of the output shaft and the axis of the output shaft is less than the maximum distance between connection ring 30 and the axis of the output shaft 10. The connection ring 30 is used to connect the output gear 20 to the output shaft 10 so as to transmit power from the output shaft 10 to the output gear 20 when a load placed on the output shaft 10 is less than a preset value and disconnect the output gear from the output shaft when the load placed on the output shaft exceeds the preset value. It should be noted that the preset value is reached when the maximum load is placed on the output shaft 10. When the load is less than the preset value, the output gear 20 stays stationary with respect to and rotates synchronously with the output shaft 10. When the load exceeds the preset value, the output shaft rotates with respect to the output gear 20, which reduces the load exerted the output gear 20, thereby preventing the output gear 20 from being damaged due to excessive load. In the embodiment, when the load exceeds the preset value, the connection ring 30 stays attached to the output gear 20 and they rotate as a whole with respect to the output shaft 10. In the embodiment, a magnet 14 is arranged on one end of the output shaft 10, and a magnetic encoder 15 is arranged opposite the magnet 14 for sensing rotation of the magnet. The magnetic encoder 15 is arranged on a circuit board 16 fixed to a Support element (not labeled) of the servo, the rotation angle of the output shaft 10 can be detected based on the information output from the magnetic encoder 15. The working principle of the magnetic encoder 15 is known and will not be described in detail. It should be noted that in an alternative embodiment the magnetic encoder may be replaced by a potentiometer.

In one embodiment, the output gear 20 is in a clearance fit with the output shaft 10, and the connection ring 30 is arranged between the output gear 20 and the output shaft 10. When the load exerted on the output shaft 10 is less than the preset value, the output gear 20 is able to rotate synchronously with the output shaft 10 because the factional force between the output shaft 10 and the connection ring 30 and between the output gear 20 and the connection ring 30 is not overcome. When the load exerted on the output shaft 10 exceeds the preset value, the connection ring 30 may rotate with respect to the output shaft 10 and/or the output gear 20. That is, when excessive load is exerted on the output shaft 10, the connection ring 30 disconnects the output gear 20 from the output shaft 10 in any of the following manners: 1). The connection ring 30 stays stationary with respect to the output shall 10 and rotate with respect to the output gear 20. 2). The connection ring 30 stays stationary with respect to the output gear 20 and rotate with respect to the output gear 10. 3). The connection ring 30 rotates with respect to the output shaft 10 and the output gear 20. In short, the output gear 20 is caused to rotate with respect to the output shaft 10 so as to effectively reduce the load of the output gear 20 and prevent the output gear 20 from being damaged.

Figure 6:
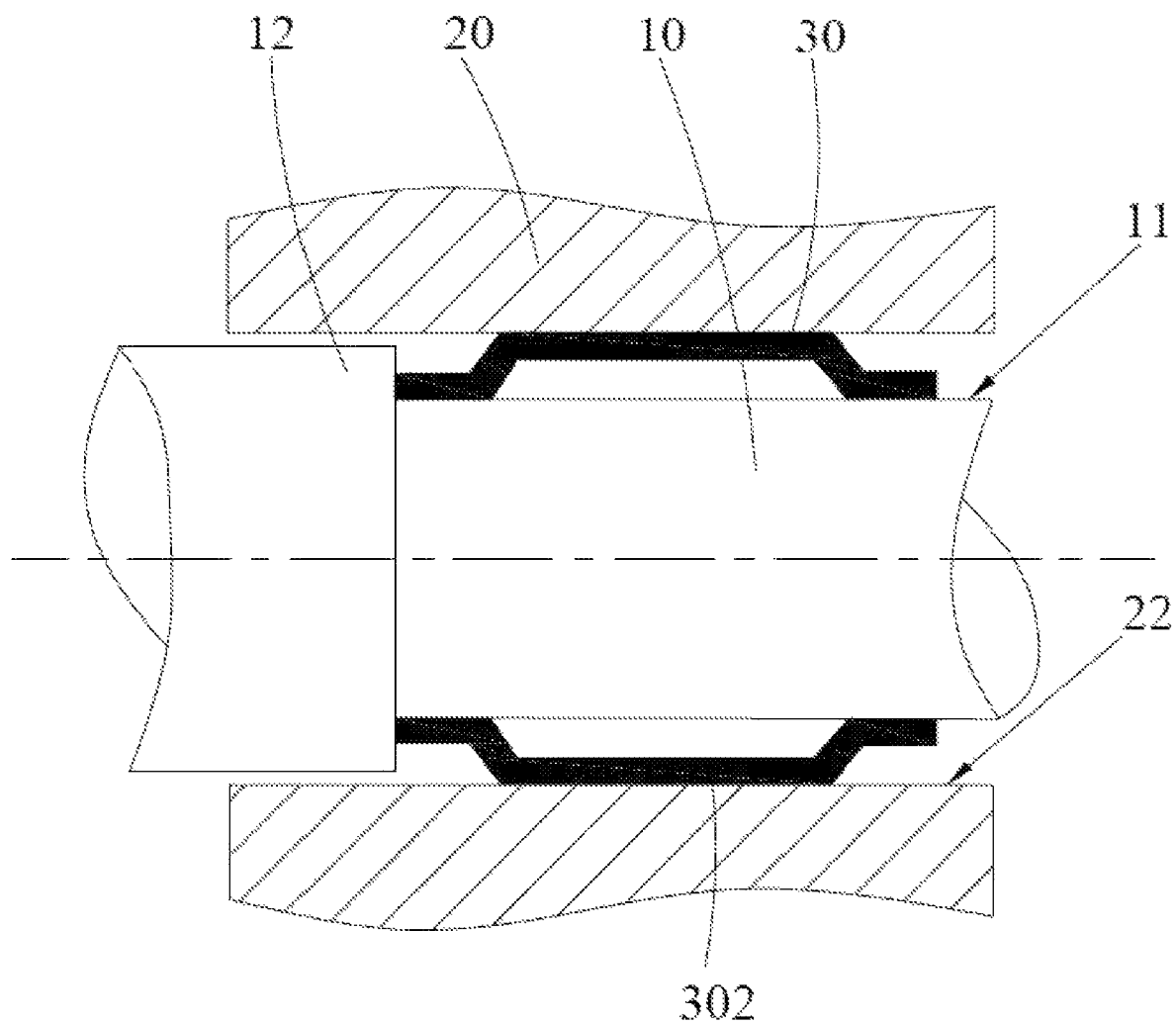
FIG. 6 is a planar sectional view showing a limiting mechanism according to a second embodiment.
Figure 7:
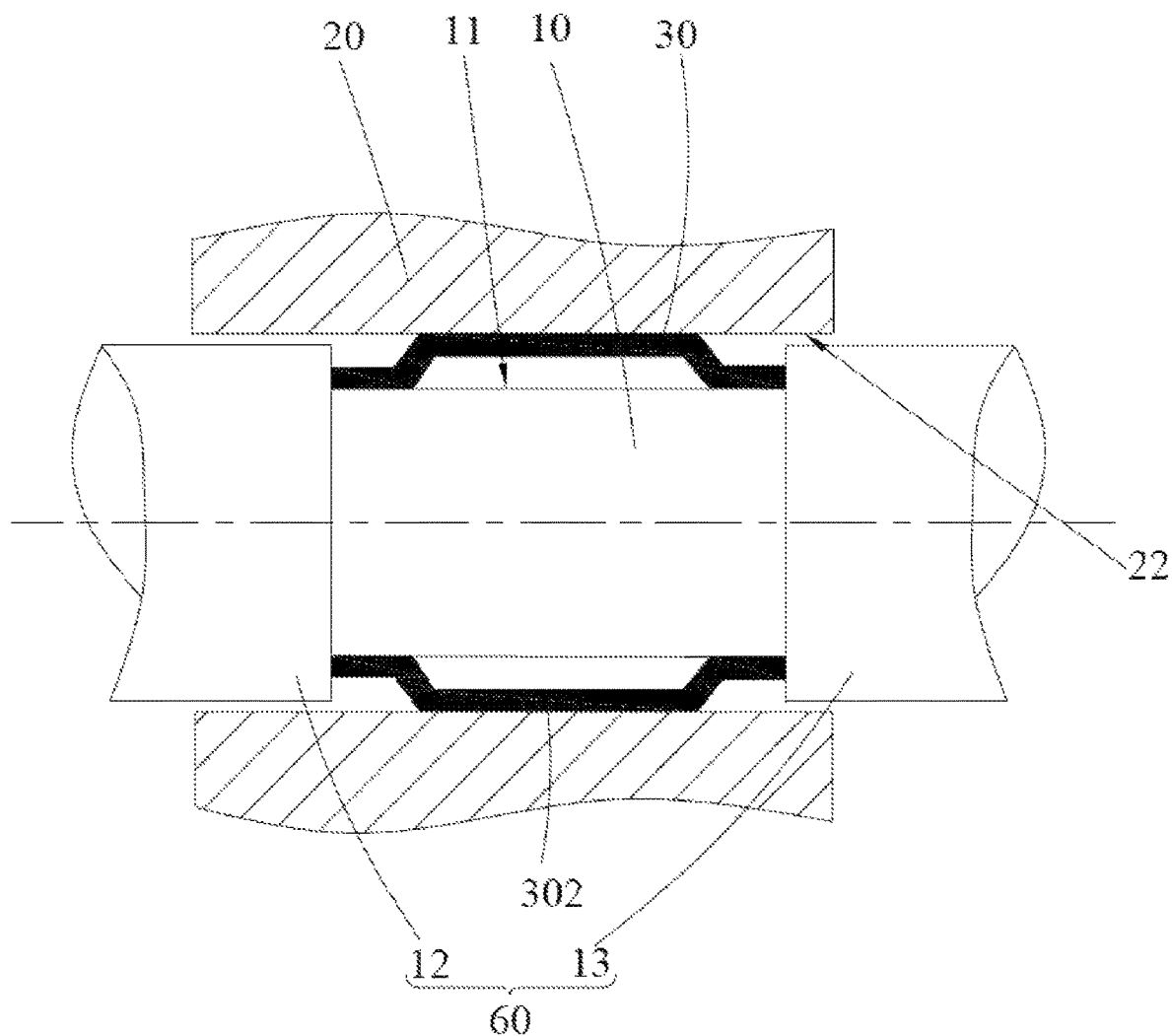
FIG. 7 is another planar sectional view showing the limiting mechanism of the second embodiment.

Referring to FIGS. 2 and 6-7, in one embodiment, the connection ring 30 is a cylindrical hollow ring with a slit 301 extending axially from one end to the opposite end. The slit 301 allows the connection ring 30 to have a certain elasticity. The connection ring 30 can thus be slightly and radially deformed when being inserted into the through hole 21 and abut tightly against the internal lateral surface of the through hole 21 and the external lateral surface of the output shaft 10 after the connection ring 30 is received in the through hole 21, thereby creating required friction between the connection ring 30 and the output gear 20 as well as the output shaft 10 for transmitting torque from the output shaft 10 to the output gear 20. In the embodiment, a number of provisions 302 protrude outward from the outer lateral surface of the connection ring 30 and abut against the internal lateral surface of the through hole 21. The internal lateral surface of the connection ring 30 abuts lightly against the external Intend surface of the output shaft 10. The protrusions 302 each extend along the axial direction of the connection ring 30. For an even distribution of the force exerted on the connection ring 30, it is preferably to arrange odd number of protrusions 302 evenly distributed on the connection ring 30. The slit 301 can be arranged between two adjacent protrusions 302, or extend along an imaginary line which one of the protrusions 302 is symmetric with respect to. In the embodiment, the connection ring 30 can be made of brass which is low in cost but tends to be worn or steel which is high in cost but has high hardness and long service life. The hardness of the output shaft 10 is greater than that of the connection ring 30 which is greater than the hardness of the output gear 20.

Figure 4:
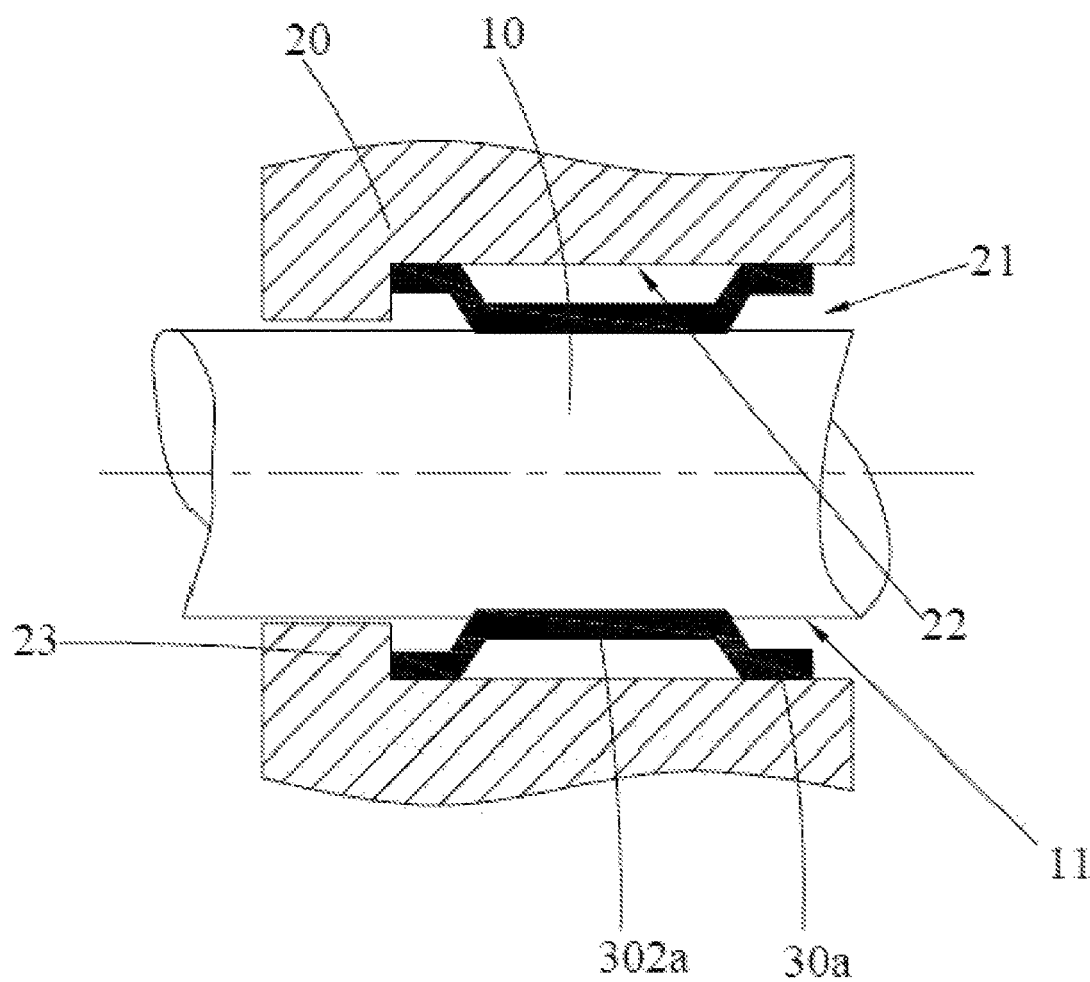
FIG. 4 is a planar sectional view showing a limiting mechanism according to a first embodiment.
Figure 5:
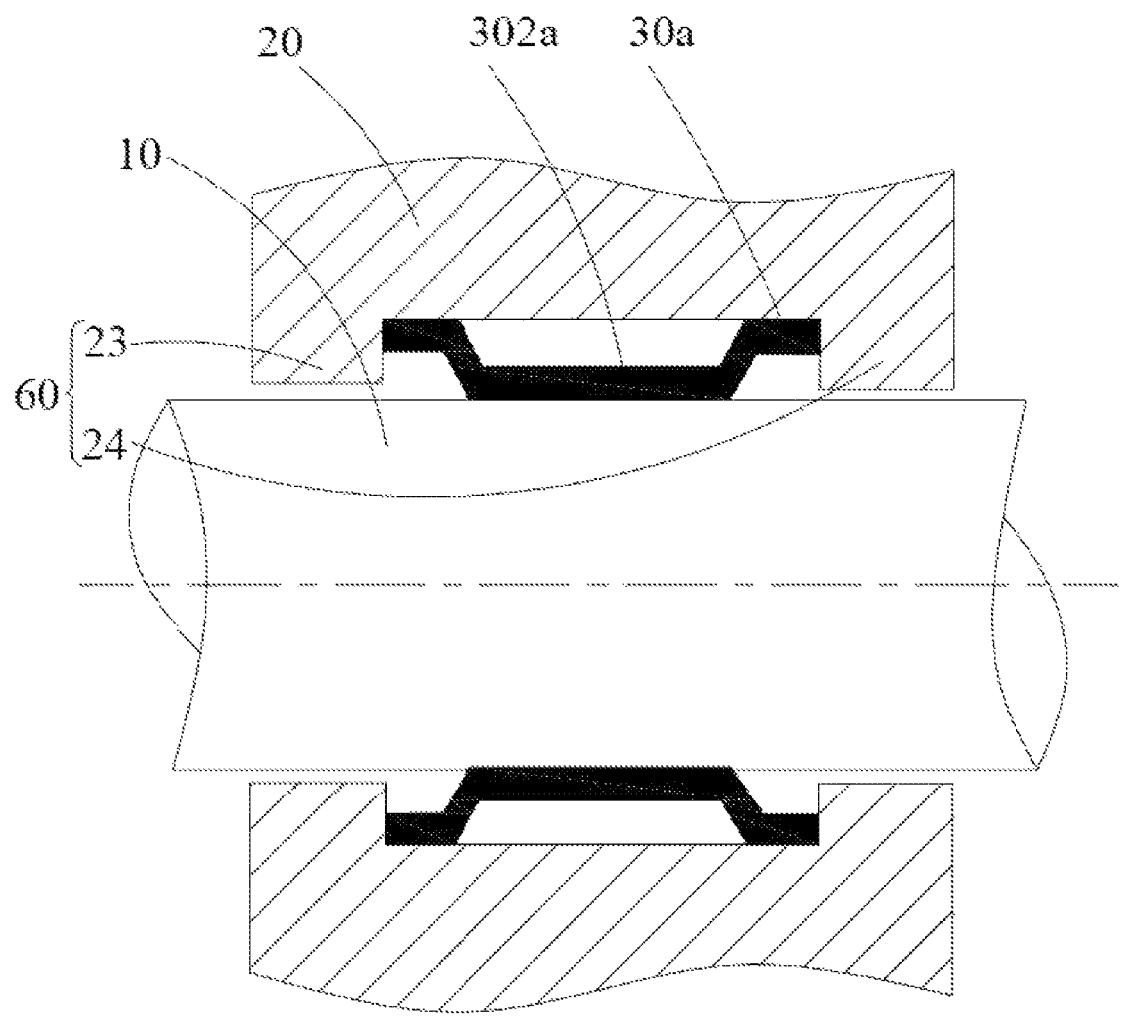
FIG. 5 is another planar sectional view showing the limiting mechanism of the first embodiment.

Referring to FIGS. 4 and 5, in an alternative embodiment, the connection ring 30 can be replaced by a connection ring 30a. The connection ring 30a has a structure similar to the connection ring 30. The difference is that a number of protrusions 302a protrude inwardly from the internal lateral surface of the hollow cylindrical ring 30a. The protrusions 302a abut tightly against the external lateral surface of the output shaft 10, and the external lateral surface of the connection ring 30a abuts tightly against the internal lateral surface of the through hole 21.

In one embodiment, the servo further includes a limiting mechanism 60 used to prevent the connection ring 30 from moving along an axial direction of the output shaft 10. When the load of the output shaft 10 is within a normal range, the output gear 20 is connected to the output shaft 10 by the friction between the connection ring 30 and the internal lateral surface 22 as well as the external lateral surface 11. The motor 40 can thus drive the output gear 20 to rotate. When the load of the output shaft 10 is excessive, the connection ring 30 will rotate with respect to the internal lateral surface 22 and/or the external lateral surface 11, causing the output gear 20 to rotate with respect to the output shaft 10. The limiting mechanism 60 can block the connection ring 30, which can avoid the problem that the connection ring 30 cannot transmit the torque after moving axially away from the position where connection ring 30 connects the output shaft 10 to the output gear 20.

Referring to FIG. 4, the limiting mechanism 60 is arranged on the internal lateral surface 22 of the through hole of the output gear 20 and includes a first protruding ring 23 protruding from the internal lateral surface. The connection ring 30a is located at one side of the first protruding ring 23. In one embodiment, the one side of the connection ring 30a abuts against the first protruding ring 23. With such configuration, the first protruding ring 23 can hold the connection ring 30a between the internal lateral surface 22 and the external lateral surface 11 and prevent the connection ring 30a from sliding in the axial direction of the output shaft 10, thereby allowing the connection ring 30a to effectively transmit torque from the output shaft 10 to the output gear.

Referring to FIG. 5, in one embodiment, the limiting mechanism 60 further includes a second protruding ring 24 protruding from the internal lateral surface 22 and spaced apart from the first protruding ring 23. The connection ring 30a is located between the first protruding ring 23 and the second protruding ring 24. In the embodiment, opposite sides of the connection ring 30a respectively abut against the first protruding ring 23 and the second protruding ring 24. With such configuration, the sliding of the connection ring 30 in the axial direction of the output shaft 10 is avoided, so that the connection ring 30a is always held between the internal lateral surface 22 and the external lateral surface 11 for torque transmission. It should be noted that the first protruding ring 23 and the second protruding ring 24 may be integrally formed with the output gear 20 by injection molding, or may be fixedly connected to the output gear 20 by fasteners such as screws. According to descriptions above, the limiting mechanism 60 abuts against at least one side of the connection ring 30a, which prevents the connection ring 30a from moving along an axial direction of the output shaft 10.

Referring to FIG. 6, in alternative embodiment, the limiting mechanism 60 is arranged on the external lateral surface 11 of the output shaft 10 and includes a third protruding ring 12 protruding from the external lateral surface 11. The connection ring 30 is located at one side of the third protruding ring 12. In the embodiment, one side of the connection ring 30 abuts against the third protruding ring 12. With such configuration, the third protruding ring 12 can hold the connection ring 30 between the internal lateral surface 22 and the external lateral surface 11 and prevent the connection ring 30 from sliding in the axial direction of the output shaft 10, thereby allowing the connection ring 30 to effectively transmit torque from the output shaft 10 to the output near.

Referring to FIG. 7, in one embodiment the limiting mechanism 60 further includes a fourth protruding ring 13 protruding from the external lateral surface 11 and spaced apart from the third protruding ring 12. The connection ring 30 is located between the third protruding ring 12 and the fourth protruding ring 13. In the embodiment, opposite sides of the connection ring 30 respectively abut against the third protruding ring 12 and the fourth protruding ring 13. With such configuration, the sliding of the connection ring 30 in the axial direction of the output shaft 10 is avoided, so that the connection ring 30 is always held between the internal lateral surface 22 and the external lateral surface 11 for torque transmission. It should be noted that the third protruding ring 12 and the fourth protruding ring 13 may be integrally formed with the output shaft 10 by injection molding, or may be fixedly connected to the output shaft 10 by fasteners such as screws.

Figure 8:
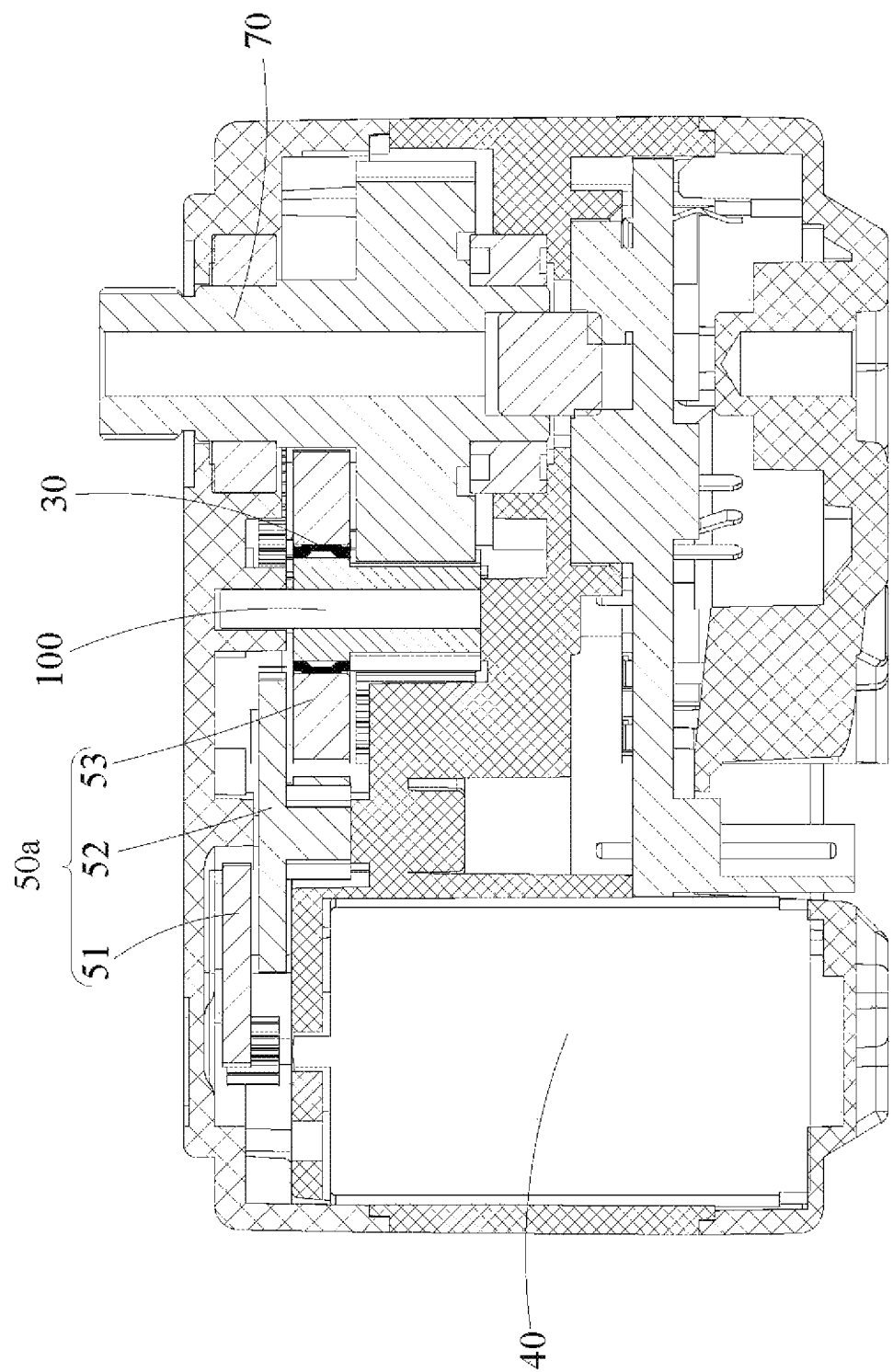
FIG. 8 is a planar sectional view of a servo according to another embodiment.
Figure 9:
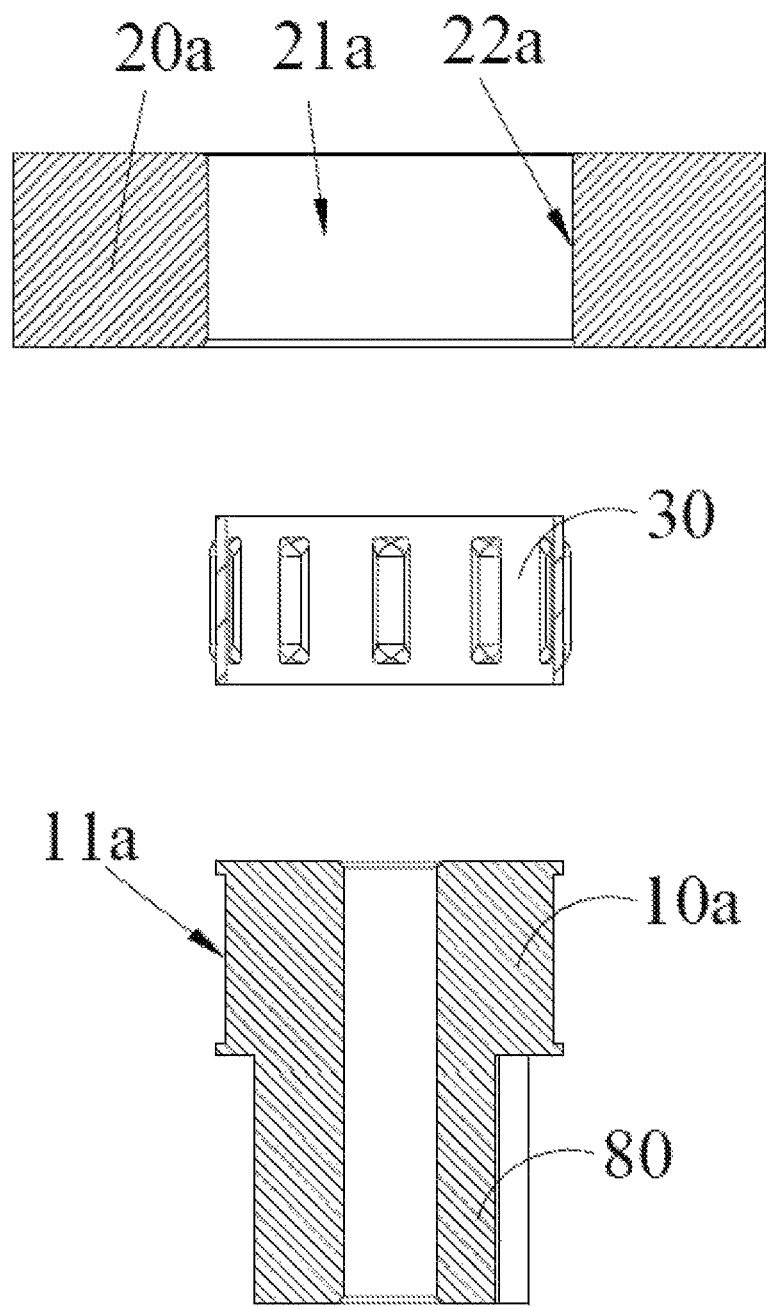
FIG. 9 is a planar exploded sectional view of a duplicate gear of FIG. 8.

FIGS. 8 and 9 show a servo according to another embodiment, which is similar to the servo of FIG. 1. The difference is that the connection ring of this embodiment is not arranged on the output gear. Specifically, the servo includes a motor 40, an output shaft 70 used to drive an external component and a gear set 50a arranged between the motor 40 and the output shaft 70 and used to transmit power from the motor 40 to the output shaft 70. The gear set 50 includes at least one duplicate gear 100. Preferably, the year set 50 includes three duplicate gears 100. For clarity, the duplicate gears are respectively denoted by reference numbers 51, 52 and 53. The first-Stage gear 51 meshes with the output gear of the motor 40 and the second-stage gear 52. The third-stage gear 53 meshes with the second-stage gear 52 and the output shaft 70. Each of the gears 51, 52 and 53 includes a first gear 80, a connection shaft 10a connected to and coaxial with the first gear 80 and a second gear 20a arranged around and coaxial with the connection shaft 10a. The second gear 20a defines a through hole 21a having an internal lateral surface 22a. The connection shall 10a has an external lateral surface 11a facing the internal lateral surface 22a. The servo further includes a connection ring 30 arranged around the connection shaft 10a between the internal lateral surface 22a and the external lateral surface 11a of any one of the three duplicate gears. The connection ring 30 has an internal side surface and an external side surface that respectively abut against the external lateral surface 11a and the internal lateral surface 22a. The connection ring 30 is used to connect the second gear 20a to the connection shaft 10a when a load placed on the connection shall 10a is less than a preset value and disconnect the second gear 20a from the connection shaft 10a when the load placed on the connection shaft 10a exceeds the preset value.

The aforementioned structures are applicable to small-sized servos with a nominal load of 2 KG or 3 KG, and also applicable to medium-sized servos with a nominal load of 12 KG, 20 KG or 25 KG.

A robot according to one embodiment of the present disclosure includes a servo as described above.

Compared with the conventional servos having a clutch means that includes two clutch elements held in position by elastic components, the servo of the present disclosure includes a connection ring that connects the output gear to the output shaft by friction therebetween, thereby eliminating the unnecessary "axial play" occurred in the conventional servos due to the using of the elastic components, which facilitates the reduction of noise.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:
1. A servo comprising:
a motor;
an output shaft configured to drive an external component, the output shaft comprising an external lateral surface;
a gear set arranged between the motor and the output shaft and configured to transmit power from the motor to the output shaft, the gear set comprising an output gear arranged around the output shaft, the output gear defines a through hole that allows the output shaft to pass therethrough, the through hole comprises an internal lateral surface facing the external lateral surface;
a connection ring arranged around the output shaft between the external lateral surface and the internal lateral surface, the connection ring comprising an internal side surface and an external side surface that respectively abut against the external lateral surface and the internal lateral surface, wherein the connection ring is configured to connect the output gear to the output shaft so as to transmit power from the output shaft to the output gear when a load placed on the output shaft is less than a preset value, and disconnect the output gear from the output shaft when the load placed on the output shaft exceeds the preset value; and
a limiting mechanism configured to prevent the connection ring from moving along an axial direction of the output shaft;
wherein the limiting mechanism is arranged on the internal lateral surface of the through hole of the output gear and comprises a first protruding ring protruding from the internal lateral surface, and the connection ring is located at one side of the first protruding ring.

2. The servo of claim 1, wherein the limiting mechanism further comprises a second protruding ring protruding from the internal lateral surface and spaced apart from the first protruding ring, and the connection ring is located between the first protruding ring and the second protruding ring.

3. A servo comprising:
a motor;
an output shaft configured to drive an external component, the output shaft comprising an external lateral surface;
a gear set arranged between the motor and the output shaft and configured to transmit power from the motor to the output shaft, the gear set comprising an output gear arranged around the output shaft, the output gear defines a through hole that allows the output shaft to pass therethrough, the through hole comprises an internal lateral surface facing the external lateral surface;
a connection ring arranged around the output shaft between the external lateral surface and the internal lateral surface, the connection ring comprising an internal side surface and an external side surface that respectively abut against the external lateral surface and the internal lateral surface, wherein the connection ring is configured to connect the output gear to the output shaft so as to transmit power from the output shaft to the output gear when a load placed on the output shaft is less than a preset value, and disconnect the output gear from the output shaft when the load placed on the output shaft exceeds the preset value; and
a limiting mechanism configured to prevent the connection ring from moving along an axial direction of the output shaft;
wherein the limiting mechanism is arranged on the external lateral surface of the output shaft and comprises a third protruding ring protruding from the external lateral surface, and the connection ring is located at one side of the third protruding ring.

4. The servo of claim 3, wherein the limiting mechanism further comprises a fourth protruding ring protruding from the external lateral surface and spaced apart from the third protruding ring, and the connection ring is located between the third protruding ring and the fourth protruding ring.

5. The servo of claim 1, wherein the connection ring is a cylindrical hollow ring, a slit extends axially from one end to the opposite end thereof, and a plurality of protrusions protruding outward from an outer lateral surface of the connection ring and abut against the internal lateral surface of the through hole.

6. The servo of claim 1, further comprising a magnet arranged at one end of the output shaft and a magnetic encoder opposing the magnet, wherein the magnetic is configured to sense rotation of the magnet.

7. The servo of claim 1, wherein the through hole is provided with a fillet or a chamber at one end thereof, which facilitates insertion of the connection ring into the through hole.

8. The servo of claim 1, wherein the output shaft has a hardness greater than a hardness of the connection ring which is greater than a hardness of the output gear.

9. The servo of claim 1, further comprising two bearings for rotatably supporting the output shaft.

10. A robot comprising a servo, the servo comprising:
a motor;
an output shaft configured to drive an external component, the output shaft comprising an external lateral surface;
a gear set arranged between the motor and the output shaft and configured to transmit power from the motor to the output shaft, the gear set comprising an output gear arranged around the output shaft, the output gear defines a through hole that allows the output shaft to pass therethrough, the through hole comprises an internal lateral surface facing the external lateral surface;
a connection ring arranged around the output shaft between the external lateral surface and the internal lateral surface, the connection ring comprising an internal side surface and an external side surface that respectively abut against the external lateral surface and the internal lateral surface, wherein the connection ring is configured to connect the output gear to the output shaft so as to transmit power from the output shaft to the output gear when a load placed on the output shaft is less than a preset value, and disconnect the output gear from the output shaft when the load placed on the output shaft exceeds the preset value; and
a limiting mechanism arranged on the internal lateral surface of the through hole of the output gear, wherein the limiting mechanism abuts against at least one side of the connection ring so as to prevent the connection ring from moving along an axial direction of the output shaft.

11. The robot of claim 10, wherein the limiting mechanism comprises a first protruding ring protruding from the internal lateral surface, and one side of the connection ring abuts against the first protruding ring.

12. The robot of claim 11, wherein the limiting mechanism further comprises a second protruding ring protruding from the internal lateral surface and spaced apart from the first protruding ring, opposite sides of the connection ring abut against the first protruding ring and the second protruding ring.

13. The robot of claim 10, wherein the connection ring is a cylindrical hollow ring, a slit extends axially from one end to the opposite end thereof, and a plurality of protrusions protruding outward from an outer lateral surface of the connection ring and abut against the internal lateral surface of the through hole.

14. The robot of claim 10, further comprising a magnet arranged at one end of the output shaft and a magnetic encoder opposing the magnet, wherein the magnetic is configured to sense rotation of the magnet.

15. The robot of claim 10, wherein the through hole is provided with a fillet or a chamber at one end thereof, which facilitates insertion of the connection ring into the through hole.

16. The robot of claim 10, wherein the output shaft has a hardness greater than a hardness of the connection ring which is greater than a hardness of the output gear.

17. The robot of claim 10, further comprising two bearings for rotatably supporting the output shaft.

* * * * *